(12) United States Patent
Ninomiya

(10) Patent No.: US 9,402,007 B2
(45) Date of Patent: Jul. 26, 2016

(54) IMAGE READING DEVICE, IMAGE FORMING APPARATUS

(71) Applicant: KYOCERA Document Solutions Inc., Osaka-shi, Osaka (JP)

(72) Inventor: Yuichi Ninomiya, Osaka (JP)

(73) Assignee: KYOCERA Document Solutions Inc., Osaka-shi (JP)

( * ) Notice: Subject to any disclaimer, the term of this patent is extended or adjusted under 35 U.S.C. 154(b) by 0 days.

(21) Appl. No.: 14/901,663

(22) PCT Filed: Nov. 26, 2014

(86) PCT No.: PCT/JP2014/081159
§ 371 (c)(1),
(2) Date: Dec. 28, 2015

(87) PCT Pub. No.: WO2015/080121
PCT Pub. Date: Jun. 4, 2015

(65) Prior Publication Data
US 2016/0150107 A1 May 26, 2016

(30) Foreign Application Priority Data

Nov. 29, 2013 (JP) ................................. 2013-247475

(51) Int. Cl.
*G03G 15/00* (2006.01)
*H04N 1/00* (2006.01)
*H04N 1/10* (2006.01)

(52) U.S. Cl.
CPC ........... *H04N 1/00522* (2013.01); *H04N 1/103* (2013.01); *H04N 1/1013* (2013.01); *H04N 1/1026* (2013.01); *H04N 2201/0094* (2013.01)

(58) Field of Classification Search
CPC .................................................... H04N 1/00522
USPC .................................................. 399/211, 213
See application file for complete search history.

(56) References Cited

FOREIGN PATENT DOCUMENTS

JP          2004118030 A    4/2004
JP          2009205107 A    9/2009

OTHER PUBLICATIONS

ISA Japanese Patent Office, Written Opinion Issued in Application No. PCT/JP2014/081159, Mar. 3, 2015, WIPO, 6 pages.

*Primary Examiner* — David Bolduc
*Assistant Examiner* — Barnabas Fekete
(74) *Attorney, Agent, or Firm* — Alleman Hall McCoy Russell & Tuttle LLP

(57) ABSTRACT

To downsize a housing and reduce a possibility that different parts of a cable contact with each other, an image forming apparatus includes a first reading unit configured to move between a movement start position and a movement end position; a second reading unit configured to move at a speed half of a moving speed of the first reading unit in conjunction with movement of the first reading unit; a control portion disposed below the first reading unit and more on the movement end position side than a movement range of the second reading unit; a cable connected from the first reading unit to the control portion via the second reading unit; and a guide member that is formed to project from the second reading unit toward the first reading unit and supports part or all of the cable between the first reading unit and the second reading unit.

5 Claims, 3 Drawing Sheets

IMAGE READING DEVICE, IMAGE FORMING APPARATUS

TECHNICAL FIELD

The present invention relates to an image reading device and an image forming apparatus that can read an image from a document sheet mounted on a document sheet mounting surface.

BACKGROUND ART

In general, in an image reading device such as a scanner that can read an image from a document sheet mounted on a document sheet mounting surface, a reading unit and a control portion are connected by a cable, wherein the reading unit performs an image reading operation by moving in a sub scanning direction. Meanwhile, with a configuration where the cable in use is folded vertically in the housing of the image reading device, part of the upper portion of the cable may hang down and contact part of the lower portion, allowing a crosstalk to occur, which may impair the control of the control portion on the reading unit. Such a contact between different parts of the cable can be restricted by securing a sufficient interval in the vertical direction between the control portion and the reading unit. However, in that case, the housing of the image reading device increases in size. With regard to this problem, there is known a configuration where the reading unit includes a clamp portion for supporting the cable (see, for example, PTL 1).

CITATION LIST

Patent Literature

[PTL 1] Japanese Laid-Open Patent Publication No. 2004-118030

SUMMARY OF THE INVENTION

Problems to be Solved by the Invention

However, in the configuration where the reading unit includes a clamp portion, only part of the upper portion of the cable is supported by the clamp portion of the reading unit. As a result, the remaining part of the upper portion of the cable that is not supported by the clamp portion still may hang down.

It is an object of the present invention to provide an image reading device and an image forming apparatus that realize the downsizing of the housing, and at the same time, reduce the possibility that different parts of a cable contact with each other.

Solution to the Problems

An image reading device according to one aspect of the present invention includes a first moving body, a second moving body, a control portion, a cable, and a guide member. The first moving body is configured to move between a first position and a second position. The second moving body is disposed to be more separate from the second position than the first moving body in a movement direction of the first moving body from the second position to the first position, and is configured to move in a same direction as the first moving body at a speed half of a moving speed of the first moving body in conjunction with a movement of the first moving body. The control portion is disposed below the first moving body and more on a second position side than a movement range of the second moving body. The cable is connected from the first moving body to the control portion via the second moving body. The guide member is formed to project from the second moving body toward the first moving body and supports part or all of the cable between the first moving body and the second moving body.

An image forming apparatus according to another aspect of the present invention includes the image reading device and an image forming portion. The image forming portion is configured to form an image based on image data read by the image reading device.

Advantageous Effects of the Invention

According to the present invention, it is possible to reduce the possibility that different parts of a cable contact with each other, while realizing the downsizing of the housing.

DESCRIPTION OF EMBODIMENTS

The following describes an embodiment of the present invention with reference to the accompanying drawings for the understanding of the invention. It should be noted that the following description is an example of a specific embodiment of the present invention and should not limit the technical scope of the invention.

[Outlined Configuration of Image Forming Apparatus 10]

First, an outlined configuration of an image forming apparatus 10 according to an embodiment of the present invention is described with reference to FIG. 1A and FIG. 1B. Here, FIG. 1A is a schematic cross-sectional view of the image forming apparatus 10, and FIG. 1B is a diagram taken along the IB-IB line of FIG. 1A and viewed from the direction of arrows.

Figure 1A:
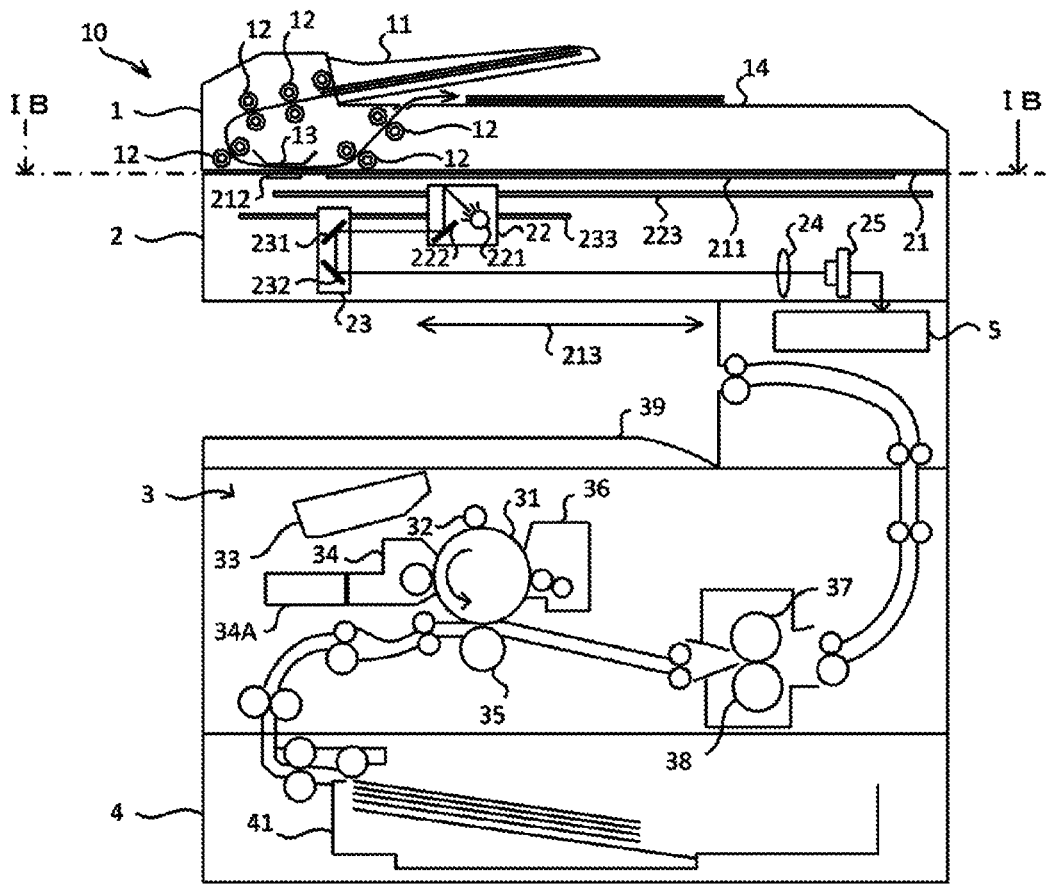
FIG. 1A is a diagram showing the configuration of an image forming apparatus according to an embodiment of the present invention.
Figure 1B:
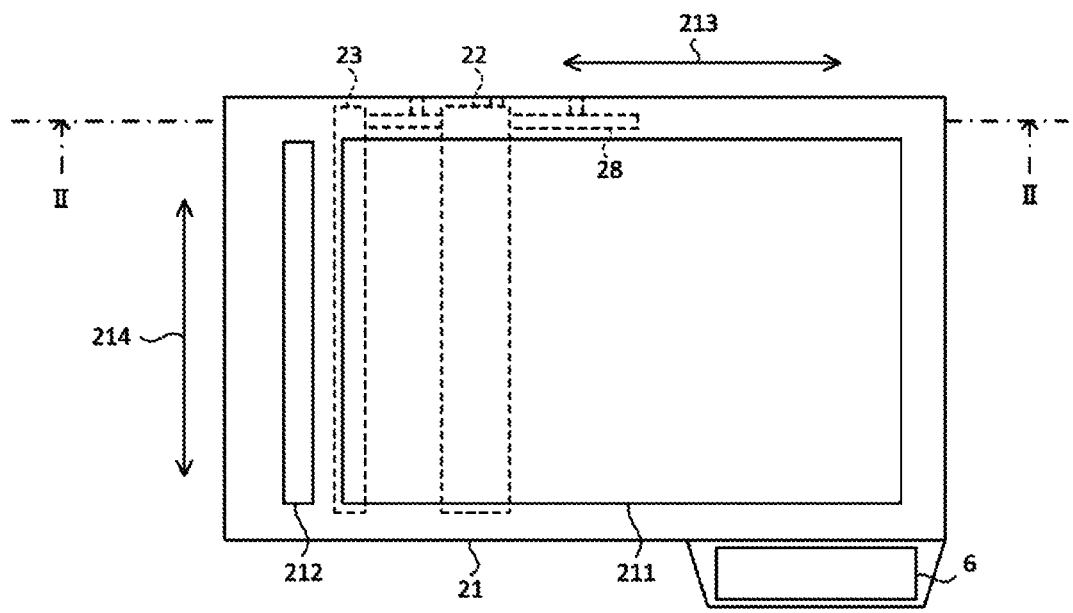
FIG. 1B is a diagram showing the configuration of the image forming apparatus according to an embodiment of the present invention.

As shown in FIG. 1A and FIG. 1B, the image forming apparatus 10 includes an ADF 1, an image reading portion 2, an image forming portion 3, a sheet feed portion 4, a control portion 5, and an operation display portion 6. The image forming apparatus 10 is a multifunction peripheral having a plurality of functions such as a printer function, a facsimile function, or a copy function. It is noted that, in the image forming apparatus 10, a configuration including the image reading portion 2 and the control portion 5 is an example of the image reading device of the present invention. In addition, the present invention is applicable to an image reading apparatus or an image forming apparatus such as a scanner, a facsimile apparatus, and a copier.

As shown in FIG. 1A, the ADF 1 is an automatic document sheet feeding device and includes a document sheet setting portion 11, a plurality of conveying rollers 12, a document sheet pressing 13, and a sheet discharge portion 14. In the ADF 1, the conveying rollers 12 are driven by motors (not shown) such that the document sheet placed on the document sheet setting portion 11 is conveyed in such a way as to pass through an image data reading position where the image data is read by the image reading portion 2, and then conveyed to the sheet discharge portion 14. With this configuration, the image reading portion 2 can read the image data from the document sheet conveyed by the ADF 1.

The image forming portion 3 is an electrophotographic image forming portion that executes an image forming process (print process) based on image data read by the image reading portion 2, or image data input from an external information processing apparatus such as a personal computer. Specifically, the image forming portion 3 includes a photoconductor drum 31, a charging device 32, an exposure device (LSU) 33, a developing device 34, a transfer roller 35, a cleaning device 36, a fixing roller 37, a pressure roller 38, and a sheet discharge tray 39. In the image forming portion 3, an image is formed in the following procedure on a sheet supplied from a sheet feed cassette 41 that is attachable to and detachable from the sheet feed portion 4, and the sheet with the image formed thereon is discharged onto the sheet discharge tray 39.

First, the charging device 32 charges the surface of the photoconductor drum 31 uniformly to a certain potential. Next, the optical scanning device 33 irradiates the surface of the photoconductor drum 31 with light based on the image data. With this operation, an electrostatic latent image corresponding to the image data is formed on the surface of the photoconductor drum 31. Then the electrostatic latent image on the photoconductor drum 31 is developed (visualized) as a toner image by the developing device 34. It is noted that the toner (developer) is supplied to the developing device 34 from a toner container 34A that is attachable to and detachable from the image forming portion 3. Subsequently, the toner image formed on the photoconductor drum 31 is transferred to a sheet by the transfer roller 35. The toner image transferred to the sheet is then heated by the fixing roller 37 to be fused and fixed to the sheet when the sheet passses through between the fixing roller 37 and the pressure roller 38. It is noted that the toner that has remained on the surface of the photoconductor drum 31 is removed by the cleaning device 36.

The control portion 5 includes control equipment such as CPU, ROM, RAM, and EEPROM. The CPU is a processor for executing various types of arithmetic processes. The ROM is a nonvolatile storage portion in which various types of information such as control programs for causing the CPU to execute various types of processes are stored in advance. The RAM is a volatile storage portion, and the EEPROM is a nonvolatile storage portion. The RAM and the EEPROM are used as temporary storage memory (working area) for the various types of processes executed by the CPU. The control portion 5 comprehensively controls the image forming apparatus 10 by executing the various types of control programs stored in advance in the ROM, by using the CPU. It is noted that the control portion 5 may be formed as an electronic circuit such as an integrated circuit (ASIC), and may be a control portion provided independently of a main control portion that comprehensively controls the image processing apparatus 10.

The operation display portion 6 includes a display portion and an operation portion. The display portion is, for example, a liquid crystal display and displays various types of information based on control instructions from the control portion 5. The operation portion includes, for example, hard keys or a touch panel through which various types of information are input to the control portion 5 based on user's operations.

Figure 2:
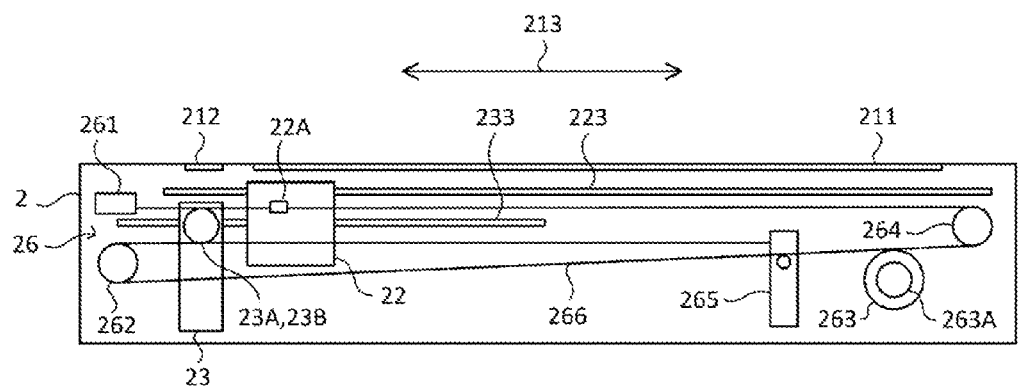
FIG. 2 is a diagram showing the configuration of a unit moving mechanism in the image forming apparatus according to an embodiment of the present invention.

As shown in FIG. 1A and FIG. 1B, the image reading portion 2 includes a document sheet table 21, a first reading unit 22, a second reading unit 23, an optical lens 24, a CCD (Charge Coupled Device) 25, and unit moving mechanisms 26 (see FIG. 2).

The document sheet table 21 is provided on the upper surface of the image reading portion 2, and includes a document sheet mounting surface 211 and a conveying-and-reading surface 212. The document sheet mounting surface 211 is a translucent contact glass on which a document sheet from which image data is to be read is mounted. Various sizes of sheets can be mounted on the document sheet mounting surface 211 by being positioned at a predetermined mounting reference position. The conveying-and-reading surface 212 is a conveying-and-reading glass which transmits light emitted from the first reading unit 22 to the document sheet that has been conveyed by the ADF 1.

The first reading unit 22 includes a light source 221 and a mirror 222. In addition, the image reading portion 2 includes a first movement rail 223 which extends long and supports the first reading unit 22 such that it can slide in a sub scanning direction 213. The first reading unit 22 is configured to move on the first movement rail 223 by a power transmitted from the unit moving mechanism 26. When the first reading unit 22 is moved in the sub scanning direction 213 by the unit moving mechanisms 26, the light emitted from the light source 221 to the document sheet table 21 is scanned in the sub scanning direction 213. Here, the first reading unit 22 is an example of the first moving body.

The light source 221 includes a number of white LEDs arranged along a main scanning direction 214. The light source 221 irradiates the document sheet with a line of white light extending in the main scanning direction 214 by emitting light so as to pass through the document sheet mounting surface 211 or the conveying-and-reading surface 212 of the document sheet table 21. A position irradiated with the light from the light source 221 is an image data reading position where the image data is read by the image reading portion 2. The reading position moves in the sub scanning direction 213 as the first reading unit 22 moves in the sub scanning direction 213. Specifically, when image data is read from a document sheet mounted on the document sheet mounting surface 211, the reading unit 22 is moved to a position for the light from the light source 221 to pass through the document sheet mounting surface 211. In addition, when image data is read from a document sheet that is conveyed by the ADF 1, the reading unit 22 is moved to a position for the light from the light source 221 to pass through the conveying-and-reading surface 212.

The mirror 222 reflects, toward the second reading unit 23, light which was emitted by the light source 221 and reflected on the surface of the document sheet at the reading position on the document sheet table 21. Here, the mirror 222 is an example of the first light guide member.

The second reading unit 23 includes a mirror 231 and a mirror 232. In addition, the image reading portion 2 includes a second movement rail 233 which extends long and supports the second reading unit 23 such that it can slide in the sub scanning direction 213. The second reading unit 23 is configured to move on the second movement rail 233 by a power transmitted from the unit moving mechanisms 26. Furthermore, the second reading unit 23 is moved in the same direction as the first reading unit 22 in conjunction with the movement of the first reading unit 22. Here, the second reading unit 23 is an example of the second moving body.

The mirror 231 and the mirror 232 reflect incident light from the mirror 222 of the first reading unit 22 and makes the light incident on the optical lens 24. Here, the mirror 231 and the mirror 232 are an example of the second light guide member.

The optical lens 24 condenses light which is incident after being reflected on the mirror 231 and the mirror 232 in the second reading unit 23, and makes the condensed light incident on the CCD 25. The CCD 25 is an image sensor including a photoelectric converting element that converts received light to an electric signal (voltage) that corresponds to the amount of the received light, and outputs the electric signal as image data. The CCD 25 inputs the electric signal to the control portion 5 as the image data of the document sheet, wherein the electric signal is based on the reflection light which is the light originally emitted from the light source 221 and reflected on the document sheet.

Next, the unit moving mechanisms 26 are described with reference to FIG. 2. Here, FIG. 2 is a view taken along the line II-II of FIG. 1B and viewed from the direction of arrows, showing the configuration of the unit moving mechanism 26 in an end portion in the main scanning direction 214. It is noted that in FIG. 2, a cable 27 and a guide member 28 and the like that are described below are omitted for the sake of explanation. The unit moving mechanisms 26 are provided respectively in opposite two end portions of the image reading portion 2 in the main scanning direction 214, wherein the first reading unit 22 and the second reading unit 23 are moved by the unit moving mechanisms 26.

As shown in FIG. 2, the unit moving mechanisms 26 each include a fixed pulley 261, a fixed pulley 262, a fixed pulley 263, a fixed pulley 264, a fixed portion 265, and a wire 266 suspended by these. The rotation shaft of the fixed pulley 261 is supported by the housing of the image reading portion 2 in a direction parallel to the vertical direction. In addition, the rotation shafts of the fixed pulley 262, fixed pulley 263 and fixed pulley 264 are supported by the housing of the image reading portion 2 in a direction parallel to the main scanning direction 214.

Here, the first movement rail 223 and the second movement rail 233 are supported by the housing of the image reading portion 2 to be parallel to the sub scanning direction 213, and are fitted in the first reading unit 22 and the second reading unit 23. With this configuration, the first movement rail 223 and the second movement rail 233 support the first reading unit 22 and the second reading unit 23 so as to be movable parallel to the sub scanning direction 213.

In addition, the first reading unit 22 includes a connection portion 22A to which the wire 266 is connected. The connection portion 22A is fixed to the housing of the first reading unit 22. With this configuration, the first reading unit 22 moves in the sub scanning direction 213 in conjunction with the movement of the wire 266 in the sub scanning direction 213.

The second reading unit 23 includes a movable pulley 23A and a movable pulley 23B that are disposed at different positions in the main scanning direction 214. The rotation shafts of the movable pulley 23A and the movable pulley 23B are supported by the housing of the second reading unit 23 to be parallel to the main scanning direction 214. The second reading unit 23 moves in the sub scanning direction 213 in conjunction with the movement of the movable pulley 23A and the movable pulley 23B in the sub scanning direction 213.

The fixed portion 265 is fixed to the housing of the image reading portion 2. An end of the wire 266 is connected to the fixed portion 265, and thereby is fixed to the housing of the image reading portion 2. The other end of the wire 266 is fixed from the fixed pulley 261 to the housing of the image reading portion 2 via an elastic member (not shown) such as a spring.

The wire 266 is suspended by the fixed pulley 261, the movable pulley 23A, the fixed pulley 262, the fixed pulley 263, the fixed pulley 264, the connection portion 22A, the movable pulley 23B, and the fixed portion 265. More specifically, in FIG. 2, the wire 266 extending out from the fixed pulley 261 is wound around the right half-circumferential surface of the movable pulley 23A, and then is wound around the left half-circumferential surface of the fixed pulley 262. Subsequently, the wire 266 is wound around from the fixed pulley 262 to the fixed pulley 263, and then is wound around the right half-circumferential surface of the fixed pulley 264. Next, the wire 266 is connected from the fixed pulley 264 to the connection portion 22A. Subsequently, the wire 266 is wound around from the connection portion 22A to the left half-circumferential surface of the movable pulley 23B, and then is connected to the fixed portion 265.

The fixed pulley 263 is configured to rotate in a normal direction and a reverse direction by a driving force transmitted from a motor 263a whose drive is controlled by the control portion 5. It is noted that the motor 263a is a driving source that is common to the unit moving mechanisms 26 that are respectively provided in the opposite two end portions of the image reading portion 2 in the main scanning direction 214. As a result, the fixed pulleys 263 of the respective unit moving mechanisms 26 are rotated in syncronization by the driving force transmitted from the same motor 263a. In this way, in the unit moving mechanisms 26, the motor 263a is driven to cause the fixed pulleys 263 to rotate and the wires 266 to move, and thereby the first reading unit 22 and the second reading unit 23 are moved by the wires 266 along the sub scanning direction 213.

Specifically, in FIG. 2, when the motor 263a is rotated counterclockwise, and the wire 266 between the fixed pulley 262 and the fixed pulley 264 moves leftward, the first reading unit 22 and the second reading unit 23 move rightward. In addition, in FIG. 3, when the motor 263a is rotated clockwise, and the wire 266 between the fixed pulley 262 and the fixed pulley 264 moves rightward, the first reading unit 22 and the second reading unit 23 move leftward. Here, in the unit moving mechanisms 26, by the principle of the running pulley, the movement amount (moving speed) of the second reading unit 23 is half the movement amount (moving speed) of the first reading unit 22. As a result, the optical path length from the emission by the light source 221 to the reflection on the document sheet and to the incidence on the CCD 25 is maintained to be constant.

In the image forming apparatus 10 with the above-described configuration, the control portion 5 controls the emission of light by the light source 221 installed in the first reading unit 22 of the image reading portion 2. As a result, the first reading unit 22 and the control portion 5 are connected by a cable 27 (see FIG. 3 and FIG. 4) inside the housing of the image reading portion 2.

Figure 3:
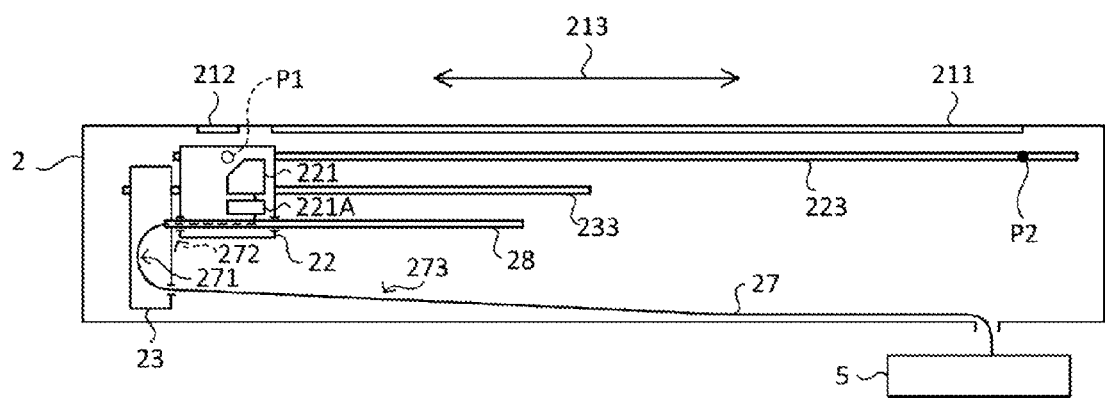
FIG. 3 is a diagram showing a cable setting state in the image forming apparatus according to an embodiment of the present invention.
Figure 4:
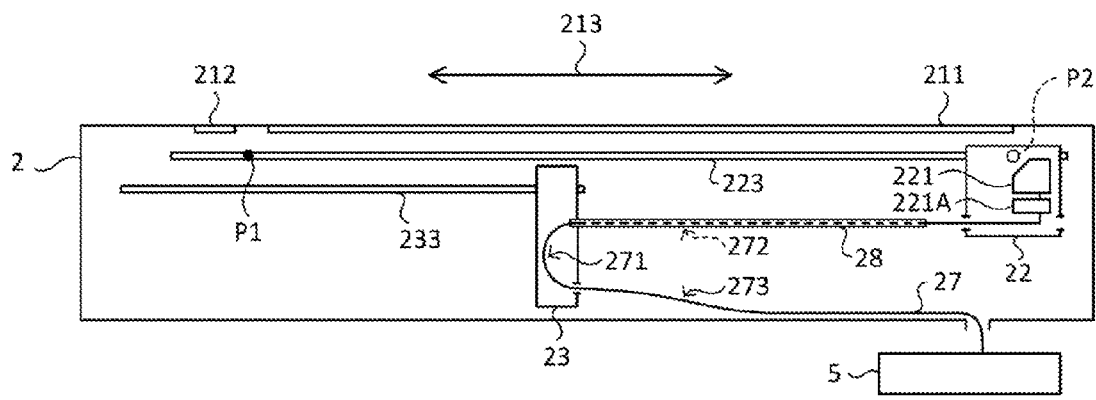
FIG. 4 is a diagram showing a cable setting state in the image forming apparatus according to an embodiment of the present invention.

Here, FIG. 3 and FIG. 4 are diagrams taken along the line II-II of FIG. 1B and viewed from the direction of arrows, and show the state where the cable 27 is installed in an end portion in the main scanning direction 214. FIG. 3 shows the state where the first reading unit 22 is at a movement start position P1 on the first movement rail 223. FIG. 4 shows the state where the first reading unit 22 is at a movement end position P2 on the first movement rail 223. It is noted that in FIG. 3 and FIG. 4, the unit moving mechanism 26 is omitted for the sake of explanation. Here, the movement start position P1 is a position on the first movement rail 223 where the first reading unit 22 can irradiate the conveying-and-reading surface 212 with light from the light source 221. In addition, the movement end position P2 is a position on the first movement rail 223 where the first reading unit 22 can irradiate the light from the light source 221 to an end portion of the document sheet mounting surface 211 that is on the opposite side from the conveying-and-reading surface 212. Here, the movement start position P1 and the movement end position P2 are examples of the first position and the second position, respectively.

The cable 27 electrically connects the control portion 5 with a light source driving portion 221A that includes a driver circuit for driving the light source 221. The cable 27 is, for example, a flexible flat cable which is formed in the shape of a belt by a plurality of wires arranged in parallel. As shown in FIG. 3 and FIG. 4, the cable 27 is connected from the light source driving portion 221A of the first reading unit 22 to the control portion 5 via the second reading unit 23. In addition, the cable 27 is disposed outside the document sheet mounting surface 211 and the conveying-and-reading surface 212 in the main scanning direction 214, and disposed in an end portion of the first reading unit 22 and the second reading unit 23 in the main scanning direction 214, so as not to interrupt the optical path that extends from the light source 221 of the first reading unit 22 to the CCD 25.

Here, in the image forming apparatus 10, the second reading unit 23 is disposed to be more separate from the movement end position P2 than the first reading unit 22 in the movement direction of the first reading unit 22 from the movement end position P2 to the movement start position P1. In addition, the control portion 5 is disposed below the first reading unit 22 and more on the movement end position P2 side than a movement range that is defined by the second movement rail 233 of the second reading unit 23. As a result, the cable 27 that is connected from the first reading unit 22 to the control portion 5 via the second reading unit 23 has a two-layer form including an upper layer, a lower layer, and a folded portion 271. A side surface of the second reading unit 23 has two openings aligned in the up-down direction for the cable 27 to pass through inside the second reading unit 23. The folded portion 271 of the cable 27 is stored in the housing of the second reading unit 23.

The folded portion 271 of the cable 27 is moved together with the second reading unit 23 as the first reading unit 22 moves along the sub scanning direction 213. Here, as described above, the second reading unit 23 moves at a speed half of the moving speed of the first reading unit 22. With this configuration, even in the case where the first reading unit 22 moves, the total length of the cable 27 is maintained to be constant, wherein the total length includes the length of an upper portion 272 of the cable 27 from the first reading unit 22 to the second reading unit 23, and the length of a lower portion 273 of the cable 27 from the second reading unit 23 to the control portion 5. This prevents the deflection of the cable 27 which would occur when the upper portion 272 of the cable 27 becomes unnecessarily long as the first reading unit 22 moves.

Meanwhile, as shown in FIG. 3, when the first reading unit 22 has moved to the movement start position P1, the length of the upper portion 272 of the cable 27 becomes the minimum. In addition, as shown in FIG. 4, when the first reading unit 22 has moved to the movement end position P2, the length of the upper portion 272 of the cable 27 becomes the maximum. Here, in the case of FIG. 4, part of the upper portion 272 of the cable 27 may hang down and contact part of the lower portion 273. In that case, a crosstalk may occur to the cable 27, and impair the control of the control portion 5 on the first reading unit 22. Such a contact between the upper portion 272 and the lower portion 273 of the cable 27 can be restricted by securing a sufficient interval in the vertical direction between the control portion 5 and the first reading unit 22. However, in that case, the housing of the image forming apparatus 10 increases in size. On the other hand, in the image forming apparatus 10 according to the embodiment of the present invention, a guide member 28 that is described below supports the upper portion 272 of the image reading portion 2 so as to restrict contact between the upper portion 272 and the lower portion 273 of the cable 27.

In the following, the guide member 28 is described with reference to FIG. 1B and FIGS. 3-6. Here, FIG. 5 is a perspective view showing the configuration of the guide member 28, and FIG. 6 is a cross-sectional view of the guide member 28.

The guide member 28 is formed to project from the second reading unit 23 toward the first reading unit 22 and supports part or all of the cable 27 between the first reading unit 22 and the second reading unit 23. Specifically, as shown in FIG. 1B, the guide member 28 is disposed in an end portion of the second reading unit 23 in the main scanning direction 214. In addition, as shown in FIG. 3 and FIG. 4, the guide member 28 projects from an upper opening provided on the side surface of the second reading unit 23 toward the first reading unit 22 along the sub scanning direction 213, and moves together with the second reading unit 23 along the sub scanning direction 213 as the second reading unit 23 moves. It is noted that on a side surface of the first reading unit 22, an opening is provided for the guide member 28 to move inside the first reading unit 22. With this configuration, in the image forming apparatus 10, the cable 27 connected to the first reading unit 22 is supported by the guide member 28 at a position separated from the first reading unit 22. This makes it possible to effectively restrict the contact between the upper portion 272 and the lower portion 273 of the cable 27. In addition, since the guide member 28 is fixed to the second reading unit 23 and moves together with the second reading unit 23, when the first reading unit 22 moves between the movement start position P1 and the movement end position P2, it is possible to keep the guide member 28 in the movement range of the first reading unit 22. As a result, it is not necessary to increase the size of the housing of the image reading portion 2 in the sub scanning direction 213.

Here, the length of the guide member 28 in the sub scanning direction 213 may be determined as appropriate based on the length of the upper portion 272 of the cable 27 when the first reading unit 22 has moved to the movement end position P2. For example, as shown in FIG. 4, the length of the guide member 28 may be approximately 90% of the length of the upper portion 272 of the cable 27 when the first reading unit 22 has moved to the movement end position P2. With this configuration, most of the upper portion 272 of the cable 27 is supported by the guide member 28, and the possibility that the upper portion 272 contacts the lower portion 273 of the cable 27 is eliminated. In particular, since the guide member 28 is provided in the second reading unit 23 that moves at a speed half of the moving speed of the first reading unit 22, it is possible to set the length of the guide member 28 to such a length that can support the whole of the upper portion 272 of the cable 27 when the length of the upper portion 272 is the maximum. It is noted that the length of the guide member 28 may be shorter than the above-described example as far as there is no possibility of a contact between the upper portion 272 and the lower portion 273.

Figure 5:
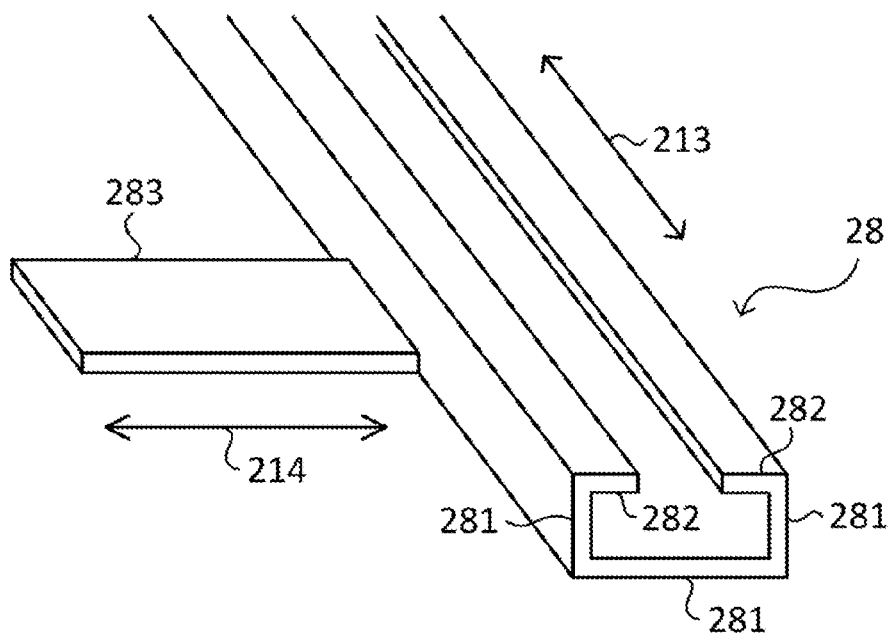
FIG. 5 is a diagram showing the configuration of a guide member of the image forming apparatus according to an embodiment of the present invention.
Figure 6:
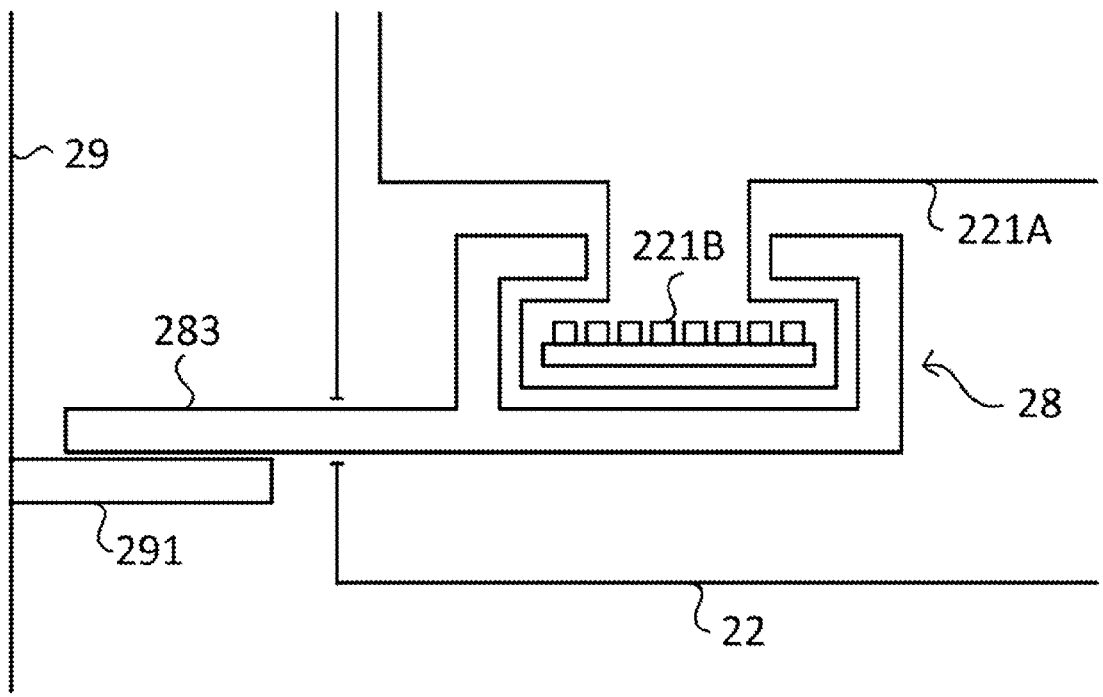
FIG. 6 is a diagram showing the configuration of the guide member of the image forming apparatus according to an embodiment of the present invention.

As shown in FIG. 5, the guide member 28 includes a support portion 281 as a configuration to support the cable 27. Furthermore, as shown in FIG. 5 and FIG. 6, the guide member 28 includes a guide support portion 283 as a configuration to horizontally support the guide member 28 itself.

In the guide member 28, the support portion 281 is formed in the shape of a groove that is composed of a bottom surface and two side walls, wherein the bottom surface is long in the sub scanning direction 213, and the side walls are erected on the bottom surface. With this configuration, the upper portion 272 of the image reading portion 2 is supported so as not to hang down between the first reading unit 22 and the second reading unit 23. In addition, the movement of the cable 27 in the main scanning direction 214 is restricted by the side walls of the support portion 281. As another embodiment, the support portion 281 may include a plurality of support portions 281 that are erected intermittently along the sub scanning direction 213. As a further embodiment, the support portion 281 may include a bottom surface that includes a plurality of openings intermittently along the sub scanning direction 213.

The support portion 281 includes a protruding portion 282 that protrudes from either or both of the two side walls so as to form an opening in an upper part of the support portion 281, wherein the width of the opening is narrower than the width of the cable 27. With this configuration, the movement of the cable 27 in the up-down direction is restricted by the protruding portion 282, and the cable 27 is restricted from contacting the housing or the like of the image forming apparatus 10.

One or more guide support portions 283 are provided on an outer side surface of the support portion 281 of the guide member 28, and horizontally support the guide member 28. For example, the guide support portion 283 is formed to extend long from the outer side surface of the support portion 281 in the main scanning direction 214. In addition, a rib member 291 that is long in the sub scanning direction 213 is provided in an inner wall 29 of the image reading portion 2. The guide support portion 283 is supported by the rib member 291 so as to be movable in the horizontal direction. This restricts a tip portion of the guide member 28 on the first reading unit 22 side from hanging down.

Meanwhile, a connection terminal of the cable 27 that is connected to the light source driving portion 221A is restricted from moving upward by the protruding portion 282 in the support portion 281. As a result, the cable 27 is connected to a connection portion 221B of the light source driving portion 221A in the support portion 281 of the guide member 28. Here, as shown in FIG. 6, the connection portion 221B is a connection terminal that extends from the light source driving portion 221A downward and is configured to move in the support portion 281. The connection portion 221B moves along the sub scanning direction 213 in the support portion 281 of the guide member 28, in conjunction with the movement of the first reading unit 22.

As described above, in the image forming apparatus 10, the upper portion 272 of the cable 27 is supported by the guide member 28 provided in the second reading unit 23 at a position separated from the first reading unit 22, and the contact between the upper portion 272 and the lower portion 273 is restricted. In addition, since the contact between the upper portion 272 and the lower portion 273 of the cable 27 is restricted by the guide member 28, there is no need to secure a sufficient interval in the vertical direction between the control portion 5 and the first reading unit 22. This makes it possible to downsize the housing of the image forming apparatus 10.

The invention claimed is:

1. An image reading device comprising:
a first moving body configured to move between a first position and a second position;
a second moving body disposed to be more separate from the second position than the first moving body in a movement direction of the first moving body from the second position to the first position, and configured to move in a same direction as the first moving body at a speed half of a moving speed of the first moving body in conjunction with a movement of the first moving body;
a control portion disposed below the first moving body and more on a second position side than a movement range of the second moving body;
a cable connected from the first moving body to the control portion via the second moving body; and
a guide member that is formed to project from the second moving body toward the first moving body and supports part or all of the cable between the first moving body and the second moving body.

2. The image reading device according to claim 1, wherein the guide member includes a support portion configured to support the cable, the support portion being in a shape of a groove.

3. The image reading device according to claim 2, wherein the first moving body includes a connection portion which can move in the support portion that is in the shape of the groove, the cable being connected to the connection portion, and
the support portion includes:
a bottom surface that is long in the movement direction of the first moving body;
two side walls that are erected on the bottom surface; and
a protruding portion that protrudes from either or both of the two side walls so as to form an opening in an upper part of the support portion, the opening being narrower in width than the cable.

4. The image reading device according to claim 1, wherein the first moving body includes:
a light source configured to emit light toward a document sheet; and
a first light guide member configured to guide, to the second moving body, the light which was emitted from the light source and reflected on the document sheet, and
the second moving body includes:
a second light guide member configured to guide the light from the first moving body to a photoelectric converting element.

5. An image forming apparatus comprising:
the image reading device according to claim 1; and
an image forming portion configured to form an image based on image data read by the image reading device.

* * * * *